Nov. 4, 1952 — H. B. BARRETT — 2,616,479
BRAKE SHOE RELINING DEVICE
Filed Aug. 28, 1950 — 2 SHEETS—SHEET 1

INVENTOR.
HARRY B. BARRETT
BY
ATTORNEY

Nov. 4, 1952 H. B. BARRETT 2,616,479
BRAKE SHOE RELINING DEVICE
Filed Aug. 28, 1950 2 SHEETS—SHEET 2

INVENTOR.
HARRY B. BARRETT
BY
ATTORNEY

Patented Nov. 4, 1952

2,616,479

UNITED STATES PATENT OFFICE 2,616,479

BRAKE SHOE RELINING DEVICE

Harry B. Barrett, St. Louis, Mo.

Application August 28, 1950, Serial No. 181,782

7 Claims. (Cl. 154—1)

This invention relates in general to brake shoe relining devices and, more particularly, to clamp means for holding a section of brake lining in proper position on a brake shoe while the lining and shoe are being heated to effect bonding by means of a thermosetting adhesive or the like.

It is the primary object of the present invention to provide a brake shoe lining clamp which is adapted for use with automotive brake shoes of varying size and which integrally incorporates means for applying pressure directly to a pair of brake shoes during heating or setting of the bonding material.

It is a further object of the present invention to provide brake shoe clamping means which contains pressure applying means for maintaining the brake lining segments in snug, even position upon the brake shoes during the bonding period thereby preventing the development of distortion, air pockets, irregular bonding, or like deformation.

It is an additional object of the present invention to provide brake shoe clamping means which may be economically manufactured, and which may be easily adjusted to desired size and otherwise conveniently operated by a mechanic at his bench.

It is also an object of the present invention to provide brake lining clamping means which employs a minimum amount of metal and is relatively compact in size so as to occupy a minimum amount of space in a bonding oven and so as to absorb a relatively small amount of heat, thereby permitting the brake shoe itself to heat up and cool off very quickly with as little heat lag as possible to prevent "overcuring" of a thermosetting adhesive.

With the above and other objects in view, my invention resides in the novel features of form, construction, arrangement, and combination of parts presently described and pointed out in the claims.

In the accompanying drawings (two sheets)—

Figure 2:
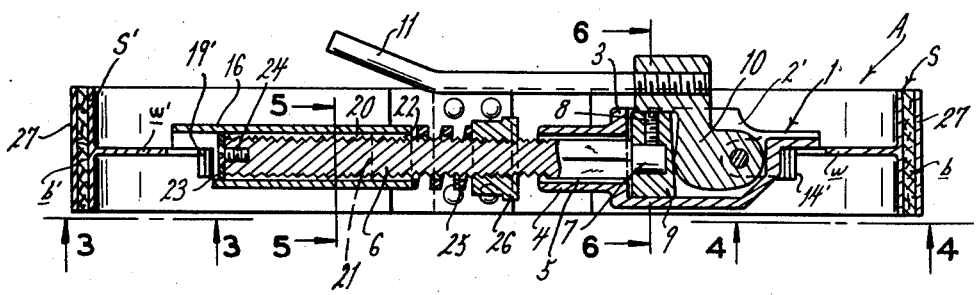
Figure 2 is a transverse sectional view taken along line 2—2 of Figure 1.
Figure 3:
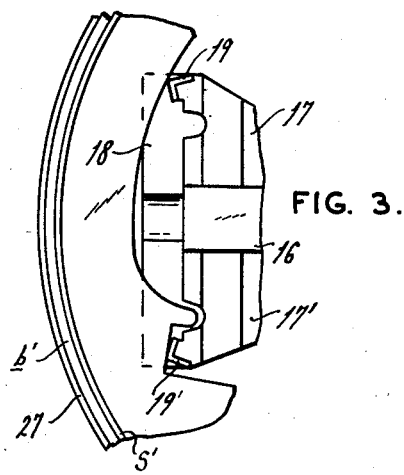
Figure 4:
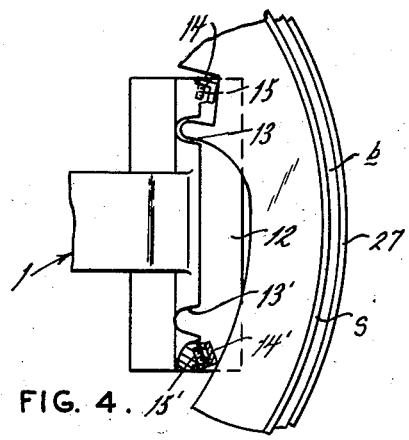
Figures 5, 6:
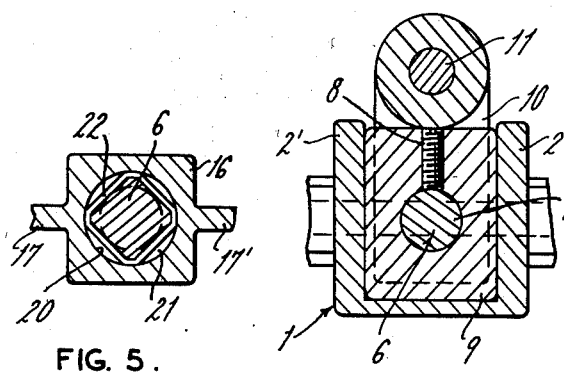
Figure 7:
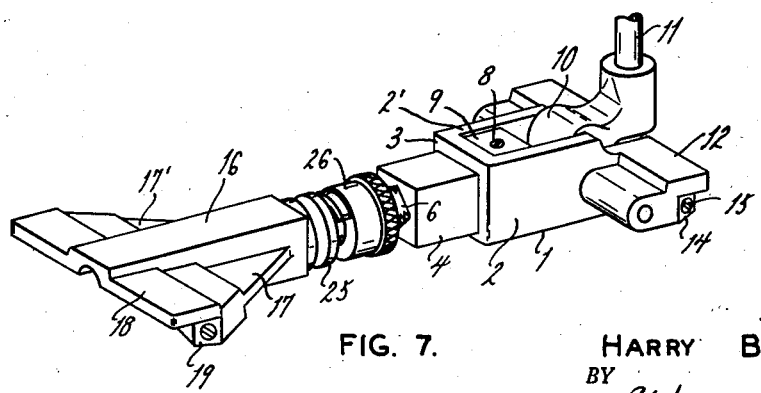

Figures 3, 4, 5 and 6 are fragmentary transverse sectional views taken along lines 3—3, 4—4, 5—5 and 6—6 respectively of Figure 2; and Figure 7 is a perspective view of the quick-operating expander forming a part of the present invention.

Referring now in more detail and by reference characters to the drawings which illustrate a preferred embodiment of the present invention, A designates a so-called "high speed" or toggle-acting machine incorporating a U-shaped member or clevis 1, having side legs 2, 2', and bight 3, the latter being provided with an integrally formed, rearwardly extending shank 4, preferably of square cross-sectional shape. Formed in and extending axially through the bight 3 and shank 4 is a broached passage 5 of square cross-sectional shape for receiving one end of a threaded rod 6, axially flatted on four sides to conform slidably to the interior shape of the passage 5. At its forward end the rod 6 is integrally provided with a reduced portion 7, held securely by means of a set screw 8 in a pad-block 9 which is, in turn, slidably held between the side legs 2, 2' and bears, on its forwardly presented face, against a toggle-cam 10 journaled between the outer ends of the side legs 2, 2' and provided with an actuating handle 11.

Figure 1:
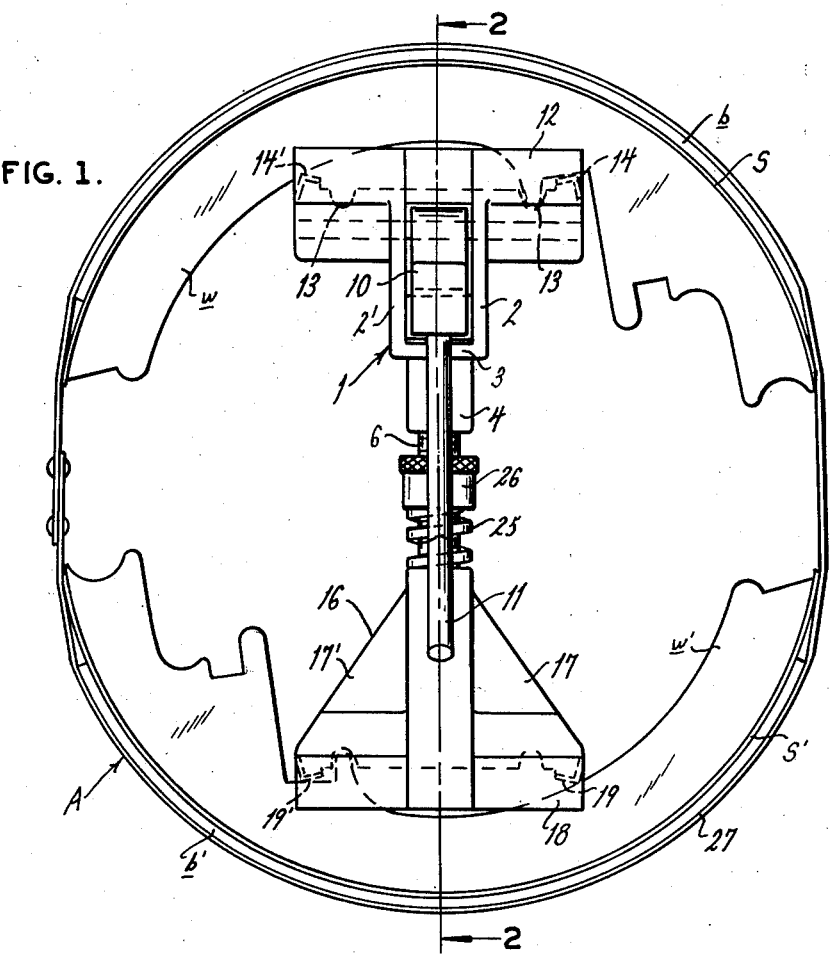
Figure 1 is a top plan view of a pair of brake shoes with sections of brake lining held in place thereon by clamping means constructed in accordance with, and embodying the present invention.

Formed integrally on the outer ends of the side legs 2, 2', and extending laterally outwardly on opposite sides thereof, is a mounting flange 12 having arcuately shaped clearance recess 13, 13' and angle-shaped abutment members 14, 14' held in place by screws 15, 15' respectively adapted for engagement against the web $w$ of an automotive brake shoe S seatingly disposed thereon, as may be seen in Figure 1.

Slidably mounted on the other end of the rod 6 is a shank-member 16 integrally provided at its outer end with oppositely triangular web 17, 17', terminating in a transverse flange 18 substantially identical with the flange 12 and likewise having abutment members 19, 19' for engagement with the web $w'$ of a second brake shoe S', as best seen in Figure 1. Interiorly the shank member 16 is provided with a tubular bore 20 which terminates at its forward end in a shoulder 21 which is in turn axially broached to provide a passage 22 of square cross-section slidably engaging the rod 6, and the interior or rearward end of the rod 6 is provided with a circular washer 23 held in place by a screw 24 for snug-fitting sliding engagement with the bore 20. It will thus be seen that the rod 6 can slide freely in and out of the bore 20 and the washer 23 will not only stabilize such sliding movement but also serve as an end stop against the shoulder 21.

Mounted encirclingly around the rod 6 in endwise contact against the forwardly presented face of the shank-member 16 is a compression spring 25 abutting at its opposite end against a collar-nut 26 threadedly mounted on the rod 6 intermediate the end faces of the shank 4 and shank member 16.

Provided for encircling disposition about the outer faces of the brake shoes S, S' is a continuous ring or band 27 fabricated preferably of sheet steel having sufficient tensile strength to resist extension and suitable flexibility to allow it to conform to the curvature of the brake shoes S, S'. The ring 27 is of substantially the same width as the brake shoes S, S' in order to apply pressure thereto throughout their outer surface, for reasons appearing more fully hereinafter.

In use, the brake shoes S, S' to be relined are seated and centered upon the abutment members 14, 14' and 19, 19' as shown in Figure 1 and the collar nut 26 adjusted to effect flush surface engagement between the band 27 and the outer faces of the brake lining sections b, b', the latter having been placed in operative position on the shoes S, S', and a layer of suitable bonding adhesive interposed therebetween in any conventional manner through their length.

With the brake lining sections b, b' maintained in disposition against the brake shoes S, S', the operator then presses the handle 11 down from the position shown in Figure 7 to the position shown in Figure 2, forcing the shoes S, S' outwardly with uniform pressure against the band 27 applying directly the force of the spring 25. It is, of course, obvious that the amount of force thus transmitted, as well as the length-adjustment of the device, is dependent upon the position of the collar-nut 26.

Thus held in place, the entire assembly may be placed in an oven (not shown), which is heated to the temperature desired, and left therein for the duration of bonding period.

It should be understood that changes and modifications in the form, construction, arrangement, and combination of the several parts of the brake shoe relining device may be made and substituted for those herein shown and described without departing from the nature and principle of my invention.

Having thus described my invention, what I claim and desire to secure by Letters Patent is—

1. A machine for effecting the adherence of linings to automotive brake shoes by thermosetting adhesives comprising a pair of oppositely presented mounting heads for supporting automotive brake shoes, an endless flexible ring disposed encirclingly about the brake shoes supported upon the mounting heads in surface engagement with the brake linings to be adhered, a rod extending between and slidably engaged at its ends in the mounting heads, a compression spring on the rod in abutting engagement at one end against one of the mounting heads, a collar adjustably mounted on the rod for abutment against the other end of the spring, an eccentric cam rotatably carried by the other mounting head and operatively bearing against the other end of the rod for creating pressure upon the brake linings by the endless ring whereby the linings will be maintained in position upon the brake shoes during the curing period.

2. A machine for effecting the adherence of linings to automotive brake shoes by thermosetting adhesives comprising a pair of oppositely presented mounting heads for supporting automotive brake shoes, an endless flexible ring disposed encirclingly about the brake shoes supported upon the mounting heads in surface engagement with the brake linings to be adhered, a rod slidably and non-rotatably mounted at its ends in, and extending between the mounting heads, a spring disposed around the rod and abutting at one end against one of the mounting heads, a collar adjustably mounted on the rod for abutment against the other end of the spring, an eccentric cam rockably carried by the other mounting head and operatively bearing against the end of the rod upon which said last named mounting head is carried for creating pressure upon the brake linings by the endless ring whereby the linings will be maintained in position upon the brake shoes during the curing period.

3. A machine for effecting the bonding of linings to automotive brake shoes by thermosetting adhesives comprising a pair of oppositely presented mounting heads for supporting automotive brake shoes having sections of brake lining disposed upon the outer surfaces thereof, an endless flexible ring disposed encirclingly about the brake shoes supported upon the mounting heads in surface engagement with the brake linings to be bonded, a rod slidably mounted at its ends in, and extending between the mounting heads, a collar adjustably mounted on the rod, a spring interposed between the collar and one of the mounting heads whereby the latter may be resiliently positioned in any position along the rod within the range of adjustment of the collar, and means for moving the mounting heads in axially opposite directions for forcing the brake shoes and associated sections of lining into engagement with the endless ring, whereby to create pressure between the brake shoes and brake linings, whereby the linings will be maintained in position upon the brake shoes during the curing period.

4. A machine for effecting the bonding of linings to automotive brake shoes by thermosetting adhesives comprising a pair of oppositely presented mounting heads for supporting automotive brake shoes having sections of brake lining disposed upon the outer surfaces thereof, an endless flexible ring disposed encirclingly about the brake shoes supported upon the mounting heads in surface engagement with the brake linings to be bonded, a rod slidably mounted at its ends in, and extending between the mounting heads, a collar adjustably mounted on the rod, a spring interposed between the collar and one of the mounting heads whereby the latter may be resiliently positioned in any position along the rod within the range of adjustment of the collar, and means on the other mounting head for moving the mounting heads in axially opposite directions for forcing the brake shoes and associated sections of lining into engagement with the endless ring, whereby to create pressure between the brake shoes and brake linings, whereby the linings will be maintained in position upon the brake shoes during the curing period.

5. A machine for effecting the bonding of linings to automotive brake shoes by thermosetting adhesives comprising a pair of oppositely presented mounting heads for supporting automotive brake shoes having sections of brake lining disposed upon the outer surfaces thereof, an endless flexible ring disposed encirclingly about the brake shoes supported upon the mounting heads in surface engagement with the brake linings to be bonded, a rod slidably and non-rotatably mounted at its ends in, and extending between the mounting heads, a collar threadedly mounted on the rod, a spring interposed between the collar and one of the mounting heads whereby the latter may be resiliently positioned in any position along the rod within the range of adjustment of the collar, and means for moving the mounting heads in axially opposite directions for forcing the brake shoes and associated sections of lining into engagement with the endless ring, whereby to create pressure between the brake shoes and brake linings, whereby the linings will be maintained in position upon the brake shoes during the curing period.

6. A machine for effecting the bonding of linings to automotive brake shoes by thermosetting adhesives comprising a pair of oppositely presented mounting heads for supporting automotive brake shoes having sections of brake lining disposed upon the outer surfaces thereof, an endless flexible ring disposed encirclingly about the brake shoes supported upon the mounting heads in surface engagement with the brake linings to be bonded, a rod slidably and non-rotatably mounted at its ends in, and extending between the mounting heads, a collar threadedly mounted on the rod, a spring interposed between the collar and one of the mounting heads whereby the latter may be resiliently positioned in any position along the rod within the range of adjustment of the collar, and a cam rotatably carried by the other mounting head and operatively bearing against one end of the rod thereby moving the mounting heads in axially opposite directions for forcing the brake shoes and associated sections of lining into engagement with the endless ring, whereby to create pressure between the brake shoes and brake linings, whereby the linings will be maintained in position upon the brake shoes during the curing period.

7. A machine for effecting the bonding of linings to automotive brake shoes by thermosetting adhesives comprising first and second mounting heads each provided with a transversely extending flange for supporting an automotive brake shoe having a section of brake lining disposed upon the outer surface thereof, the first mounting head being integrally provided with a tubular sleeve extending inwardly from the flange and being provided with an internal bore having a non-circular cross-section, the second mounting head being provided with an inwardly extending clevis having spaced parallel side legs and a transverse bight, the latter being provided with an integrally formed inwardly extending sleeve-like shank provided with an internal bore of non-circular cross-section, a toggle-cam journaled between the outer ends of the side legs and provided with an outwardly extending actuating handle, a rod slidably and non-rotatably fitted at its opposite ends and extending axially between the sleeves of the first and second mounting heads, a collar adjustably mounted on the rod in the space intermediate the mounting heads, and a compression spring coiled about the rod and being abuttingly disposed at one end against the collar and at the other end against the transverse end of the sleeve of the first mounting head.

HARRY B. BARRETT.

REFERENCES CITED

The following references are of record in the file of this patent:

UNITED STATES PATENTS

| Number | Name | Date |
|---|---|---|
| 2,358,483 | Tilden | Sept. 19, 1944 |
| 2,455,341 | Saunders | Nov. 30, 1948 |
| 2,498,937 | Barrett | Feb. 28, 1950 |
| 2,515,746 | Urbano | July 18, 1950 |